(12) United States Patent
Suzuki et al.

(10) Patent No.: US 7,662,502 B2
(45) Date of Patent: Feb. 16, 2010

(54) FUEL CELL SYSTEM

(75) Inventors: Masaharu Suzuki, Utsunomiya (JP);
Yasunori Kotani, Utsunomiya (JP);
Kentaro Nagoshi, Utsunomiya (JP);
Hideaki Kikuchi, Utsunomiya (JP);
Yoshihito Kimura, Utsunomiya (JP);
Tadashi Nishiyama, Sakura (JP);
Yasuhiro Watanabe, Kawaguchi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/413,153

(22) Filed: Mar. 27, 2009

(65) Prior Publication Data
US 2009/0246598 A1    Oct. 1, 2009

(30) Foreign Application Priority Data
Mar. 27, 2008    (JP)    ............................. 2008-083584

(51) Int. Cl.
*H01M 8/04*    (2006.01)
(52) U.S. Cl. .......................................... 429/34; 429/12
(58) Field of Classification Search .................. None
See application file for complete search history.

(56) References Cited

U.S. PATENT DOCUMENTS

| 7,105,243 | B2 | 9/2006 | Morishima et al. | |
|---|---|---|---|---|
| 2004/0202911 | A1* | 10/2004 | Komura et al. | ............... 429/32 |
| 2006/0088756 | A1* | 4/2006 | Sato et al. | ..................... 429/38 |

FOREIGN PATENT DOCUMENTS

JP    2004-95528 A1    3/2004

* cited by examiner

*Primary Examiner*—John S Maples
(74) *Attorney, Agent, or Firm*—Lahive & Cockfield, LLP; Anthony A. Laurentano

(57) ABSTRACT

A fuel cell system includes a fuel cell stack formed by stacking a plurality of power generation cells, and an ejector for supplying a fuel gas to the fuel cell stack. A flow rectifier for rectifying the flow of the fuel gas is provided at a portion of an insulating plate of the fuel cell stack connecting the ejector and the fuel gas supply passage. The flow rectifier includes an opening having a laterally elongated shape in correspondence with the bottom of the fuel gas supply passage having a laterally elongated shape, and a plurality of holes provided above the opening.

4 Claims, 6 Drawing Sheets

FUEL CELL SYSTEM

BACKGROUND OF THE INVENTION

1. Field of the Invention

The present invention relates to a fuel cell system including a fuel cell stack formed by stacking a plurality of power generation cells, and a reactant gas supply mechanism having an ejector for supplying a reactant gas to the fuel cell stack, and returning the reactant gas discharged from the fuel cell stack after consumption to the fuel cell stack. The reactant gas supply mechanism is connected to one end plate of the fuel cell stack.

2. Description of the Related Art

For example, a solid polymer electrolyte fuel cell employs an electrolyte membrane (electrolyte) comprising a polymer ion exchange membrane. The electrolyte membrane is interposed between an anode and a cathode to form a membrane electrode assembly (electrolyte electrode assembly). The membrane electrode assembly is sandwiched between separators to form a power generation cell. In use, normally, a predetermined number of power generation cells are stacked together to form a fuel cell stack.

In the fuel cell, a fuel gas such as a hydrogen gas is supplied to the anode, and a fuel off gas containing the fuel gas which has not been consumed in the power generation reaction is discharged from the fuel cell. Therefore, in the fuel cell, in the interest of economy, in order to effectively use the fuel gas, in general, the fuel off gas is supplied again to the anode as the fuel gas.

For example, as shown in FIG. 6, a fuel cell system disclosed in Japanese Laid-Open Patent Publication No. 2004-095528 includes a hydrogen supply channel 3 for supplying hydrogen from a hydrogen supply apparatus 1 to a fuel cell 2 (a stack body formed by stacking a plurality of power generation cells 2a), an off gas circulation channel 4 for merging the off gas discharged from the fuel cell 2 into the hydrogen supply channel 3 and supplying the off gas to the fuel cell 2 for recycling the off gas in the fuel cell 2, an ejector pump 5 circulating the off gas to the off gas circulation channel 4, while being capable of controlling the circulation amount of the off gas and mixing the off gas to the hydrogen in the main supply, and a pressure sensor 6 for detecting the pressure of the off gas ejected from the ejector pump 5.

In the case where the ejector pump 5 is provided in the vicinity of the fuel cell 2, since the high pressure hydrogen is ejected from the ejector pump 5 into the hydrogen supply passage of the fuel cell 2, static pressure distribution tends to occur in the hydrogen supply passage. Thus, in the fuel cell 2, in particular, the hydrogen is not sufficiently supplied to the power generation cell 2a provided at the hydrogen inlet, and the power generation performance is lowered undesirably.

SUMMARY OF THE INVENTION

The present invention has been made in consideration of the needs mentioned above, and an object of the present invention is to provide a fuel cell system which makes it possible to distribute, and supply reactant gases uniformly and reliably to each of power generation cells stacked into a fuel cell stack.

The present invention relates to a fuel cell system including a fuel cell stack formed by stacking a plurality of power generation cells in a stacking direction, and a reactant gas supply mechanism. A reactant gas supply passage for supplying at least a fuel gas or an oxygen-containing gas as a reactant gas extends through the fuel cell stack in the stacking direction. The reactant gas supply mechanism has an ejector for supplying the reactant gas to the reactant gas supply passage, and returning the reactant gas discharged from the fuel cell stack after consumption to the reactant gas supply passage. The reactant gas supply mechanism is connected to one end plate of the fuel cell stack.

The fuel cell stack includes an insulating plate adjacent to the one end plate, and the insulating plate includes a flow rectifier at a portion connecting the ejector and the reactant gas supply passage for rectifying the flow of the reactant gas.

In the present invention, when the reactant gas is ejected from the ejector into the reactant gas supply passage of the fuel cell stack, by operation of the flow rectifier provided in the insulating plate, the flow of the fuel gas is rectified.

In the structure, the flow rate of the reactant gas is lowered, and static pressure distribution in the fuel gas supply passage is improved. Thus, the reactant gas is uniformly and reliably supplied to the power generation cells stacked into the fuel cell stack. The power generation performance and the performance of starting operation are improved effectively. Further, by adding a flow rectifying function to a normal insulating plate, the number of components can be reduced.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENT

Figure 1:
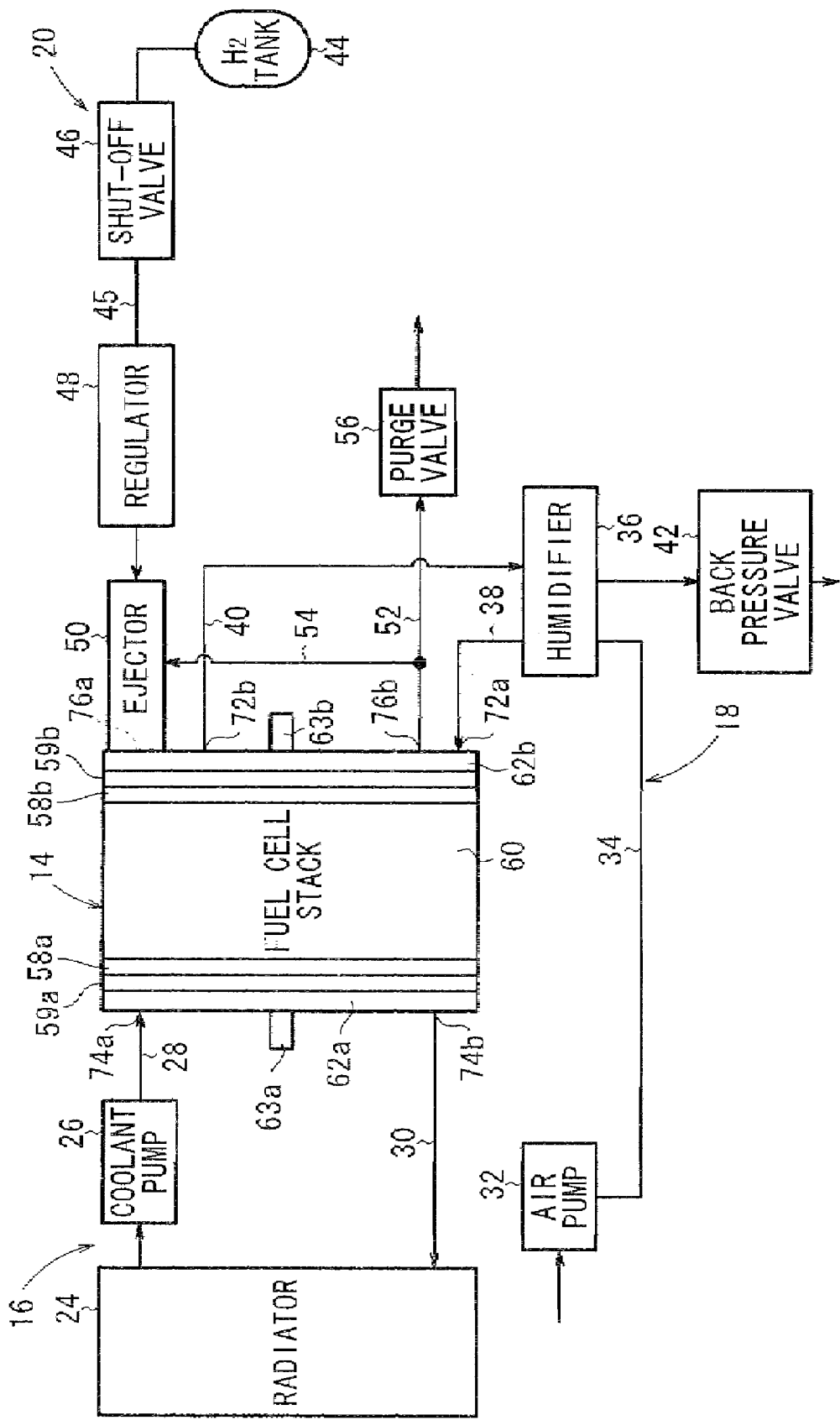
FIG. 1 is a diagram schematically showing structure of a fuel cell system according to a first embodiment of the present invention.

FIG. 1 is a diagram schematically showing structure of a fuel cell system 10 according to a first embodiment of the present invention.

The fuel cell system 10 is mounted in a fuel cell vehicle (not shown). The fuel cell system 10 includes a fuel cell stack 14, a coolant supply mechanism 16 for supplying a coolant to the fuel cell stack 14, an oxygen-containing gas supply mechanism 18 for supplying an oxygen-containing gas (reactant gas) to the fuel cell stack 14, and a fuel gas supply mechanism 20 for supplying a fuel gas (reactant gas) to the fuel cell stack 14.

The coolant supply mechanism 16 includes a radiator 24. The radiator 24 is connected to a coolant supply pipe 28 through a coolant pump 26, and connected to a coolant discharge pipe 30.

The oxygen-containing gas supply mechanism 18 includes an air pump 32 provided near the coolant pump 26. One end of an air supply pipe 34 is connected to the air pump 32, and the other end of the air supply pipe 34 is connected to a humidifier 36. The humidifier 36 is connected to the fuel cell stack 14 through a humidified air supply pipe 38. An off gas supply pipe 40 for supplying the consumed oxygen-containing gas (hereinafter referred to as the off gas) as humidified fluid is connected to the fuel cell stack 14 and the humidifier 36. A back pressure valve 42 is provided on a side of the humidifier 36 where the off gas supplied through the off gas supply pipe 40 is discharged.

The fuel gas supply mechanism 20 includes a fuel gas tank 44 where a hydrogen gas is stored as a fuel gas. One end of a fuel gas pipe 45 is connected to the fuel gas tank 44, and the other end of the fuel gas pipe 45 is connected to the fuel cell stack 14 through a shut-off valve 46, a regulator 48, and an ejector 50.

An exhaust fuel gas pipe 52 for discharging the consumed fuel gas is connected to the fuel cell stack 14. The exhaust fuel gas pipe 52 is connected to the ejector 50 through a return pipe 54, and also connected to a purge valve 56.

Figure 2:
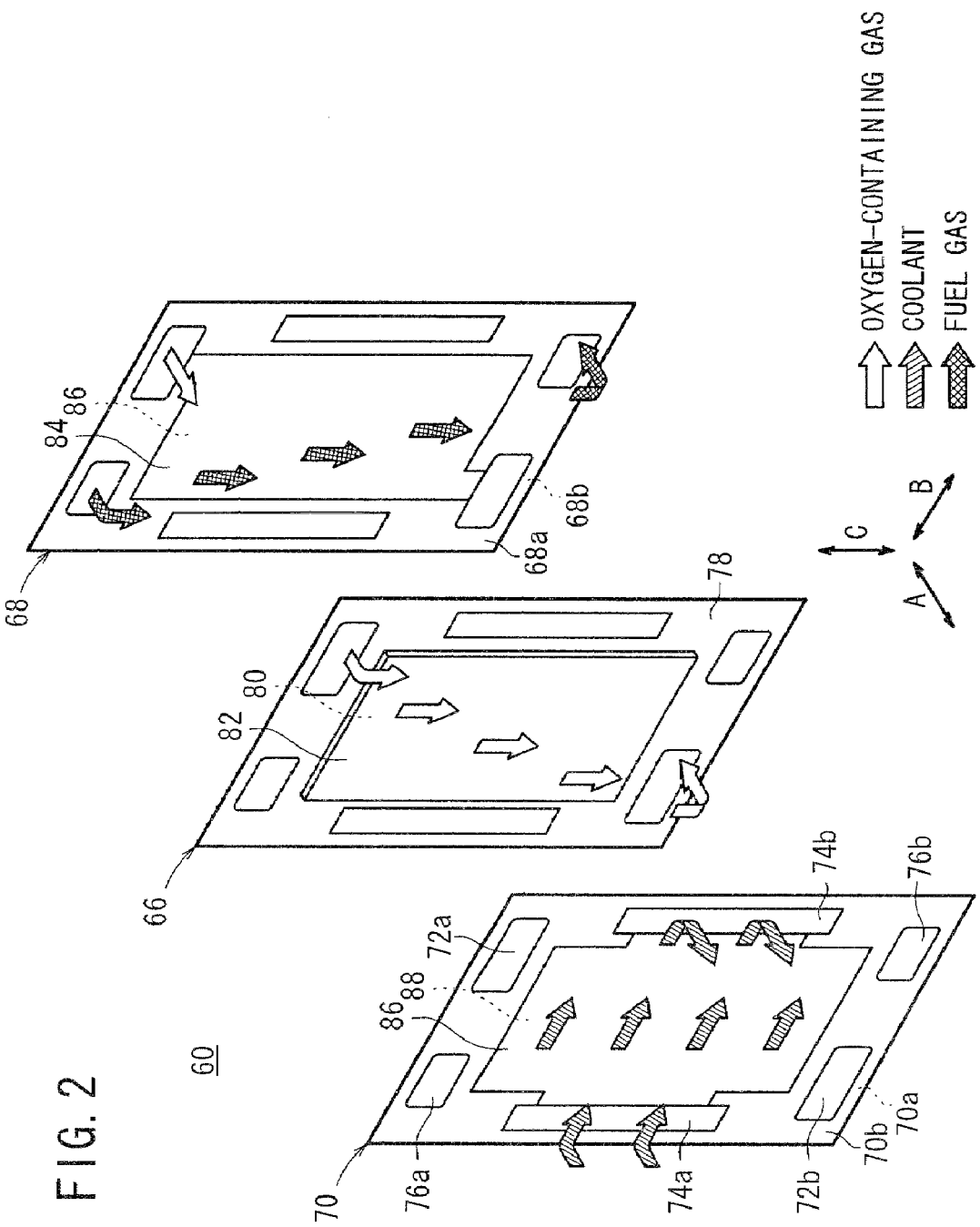
FIG. 2 is an exploded perspective view showing a power generation cell of a fuel cell stack of the fuel cell system.

The fuel cell stack 14 is formed by stacking a plurality of power generation cells 60 laterally in a direction indicated by an arrow A in FIG. 2. As shown in FIG. 1, at opposite ends of the power generation cells 60 in the stacking direction, metal end plates 62a, 62b are provided through terminal plates 58a, 58b and insulating plates 59a, 59b. The fuel cell stack 14 has a casing (not shown) including end plates 62a, 62b. Alternatively, the fuel cell stack 14 has tie-rods (not shown) for tightening components between the end plates 62a, 62b.

Power collecting terminals 63a, 63b are provided at the terminal plates 58a, 58b. The power collecting terminals 63a, 63b protrude from the end plates 62a, 62b outwardly in the stacking direction, and are connected to a travel motor and auxiliary devices.

As shown in FIG. 2, each of the power generation cells 60 includes a membrane electrode assembly 66, and first and second separators 68, 70 sandwiching the membrane electrode assembly 66. The power generation cells 60 have an elongated shape. The first and second separators 68, 70 are carbon separators or metal separators.

At one end (upper end) of the power generation cell 60 in a longitudinal direction indicated by an arrow C, an oxygen-containing gas supply passage 72a for supplying an oxygen-containing gas and a fuel gas supply passage (reactant gas supply passage) 76a for supplying a fuel gas such as a hydrogen-containing gas are provided. The oxygen-containing gas supply passage 72a and the fuel gas supply passage 76a extend through the power generation cell 60 in the direction indicated by the arrow A.

At the other end (lower end) of the power generation cell 60 in the longitudinal direction, an oxygen-containing gas discharge passage 72b for discharging the oxygen-containing gas, and a fuel gas discharge passage 76b for discharging the fuel gas are provided. The oxygen-containing gas discharge passage 72b and the fuel gas discharge passage 76b extend through the power generation cell 60 in the direction indicated by the arrow A.

At one end of the power generation cell 60 in a lateral direction indicated by an arrow B, a coolant supply passage 74a for supplying a coolant is provided. At the other end of the power generation cell 60 in the lateral direction, a coolant discharge passage 74b for discharging the coolant is provided. The coolant supply passage 74a and the coolant discharge passage 74b have a vertically elongated shape.

The membrane electrode assembly 66 includes an anode 80, a cathode 82, and a solid polymer electrolyte membrane 78 interposed between the anode 80 and the cathode 82. The solid polymer electrolyte membrane 78 is formed by impregnating a thin membrane of perfluorosulfonic acid with water, for example.

The first separator 68 has a fuel gas flow field 84 on its surface 68a facing the membrane electrode assembly 66. The fuel gas flow field 84 is connected to the fuel gas supply passage 76a and the fuel gas discharge passage 76b. For example, the fuel gas flow field 84 comprises a plurality of grooves extending in the direction indicated by the arrow C. Further, a coolant flow field 86 is formed on a surface 68b on the back side of the surface 68a of the first separator 68. The coolant flow field 86 is connected to the coolant supply passage 74a and the coolant discharge passage 74b. The coolant flow field 86 comprises grooves extending in the direction indicated by the arrow B.

The second separator 70 has an oxygen-containing gas flow field 88 on its surface 70a facing the membrane electrode assembly 66. The oxygen-containing gas flow field 88 comprises grooves extending in the direction indicated by the arrow C. The oxygen-containing gas flow field 88 is connected to the oxygen-containing gas supply passage 72a and the oxygen-containing gas discharge passage 72b. A surface 70b on the back side of the surface 70a of the second separator 70 is overlapped with a surface 68b of the first separator 68 to form the coolant flow field 86. Though not shown, seal members are provided on the first and second separators 68, 70 as necessary.

Figure 3:
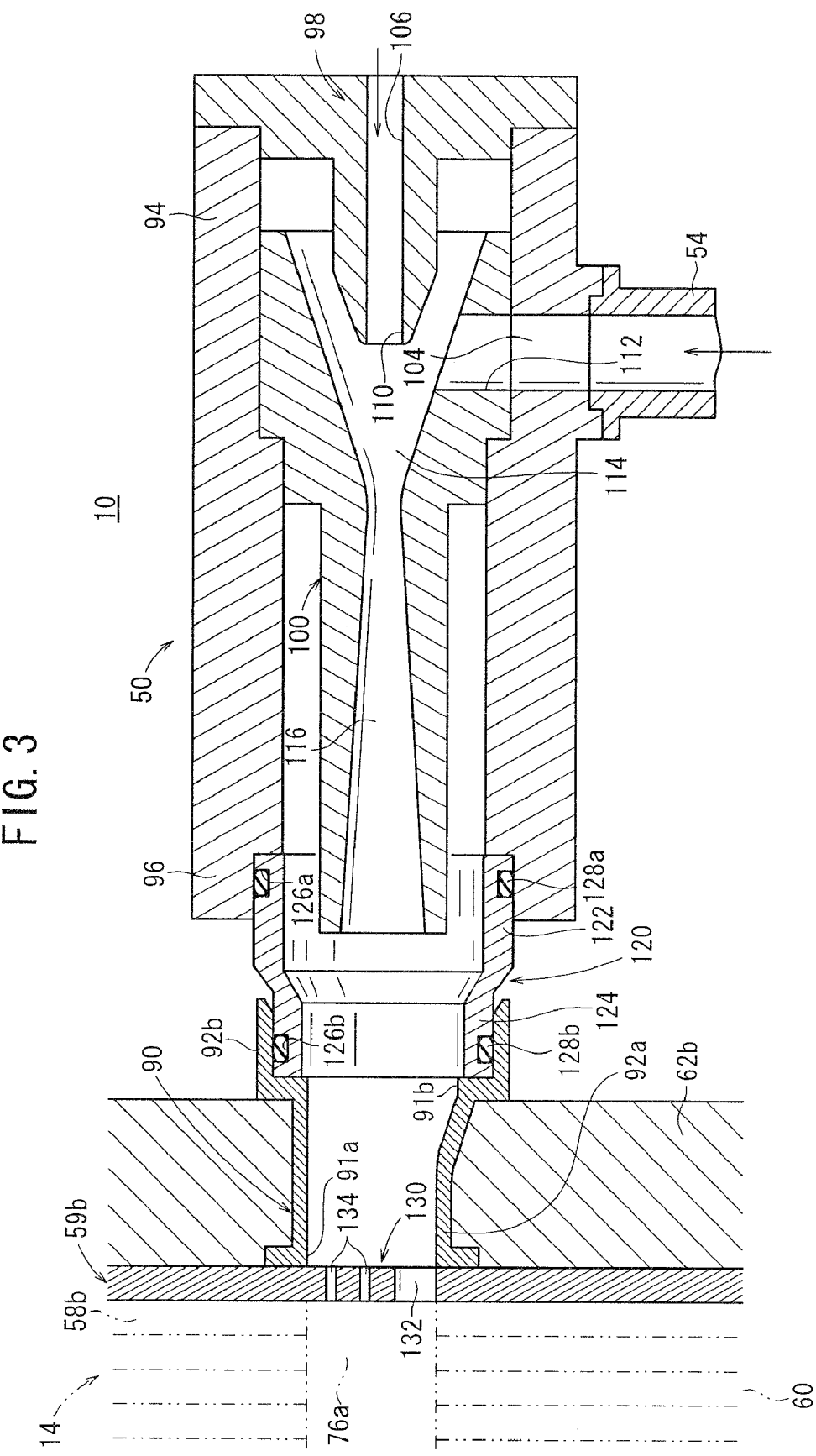
FIG. 3 is a cross sectional view showing main components of the fuel cell system.

As shown in FIG. 3, a resin manifold member 90 is attached to the end plate 62b. The manifold member 90 is connected to the fuel gas supply passage 76a, and includes a non-circular cylindrical portion 92a and a circular cylindrical portion 92b. The non-circular cylindrical portion 92a includes a channel 91a having a laterally elongated shape (laterally elongated opening) in correspondence with the shape of the fuel gas supply passage 76a. The circular cylindrical portion 92b protrudes outwardly from the end plate 62b, and has a circular channel 91b. The non-circular cylindrical portion 92a and the circular cylindrical portion 92b are formed integrally into one piece.

The ejector 50 includes a main body 94 and a cylindrical portion 96. A nozzle 98 and a diffuser 100 are disposed in the main body 94. An off gas channel 104 is formed in the main body 94. A fuel gas channel 106 connected to the fuel gas pipe 45 is formed in the nozzle 98. The fuel gas channel 106 is opened into the diffuser 100 through an injection port 110 provided at the front end of the nozzle 98.

The return pipe 54 is connected to the off gas channel 104, and connected to a suction chamber 114 through a hole 112 formed in the outer circumference of the diffuser 100. The suction chamber 114 is tapered toward the front end, and then, connected to an outlet channel 116. The diameter of the outlet channel 116 is increased continuously toward the downstream side in the flow direction.

An intermediate joint 120 is provided at a portion connecting the front end of the cylindrical portion 96 and the circular cylindrical portion 92b of the manifold member 90. The intermediate joint 120 is a cylindrical member, and includes a large diameter portion 122 and a small diameter portion 124. The large diameter portion 122 and the small diameter portion 124 are formed integrally into one piece.

An annular groove 126a is formed in the large diameter portion 122, and an annular groove 126b is formed in the small diameter portion 124. The large diameter portion 122 has an O-ring 128a in the annular groove 126a, and the large diameter portion 122 is fitted into the cylindrical portion 96 of the ejector 50. The small diameter portion 124 has an O-ring 128b in the annular groove 126b, and the small diameter portion 124 is fitted into the circular cylindrical portion 92b of the manifold member 90.

Figure 4:
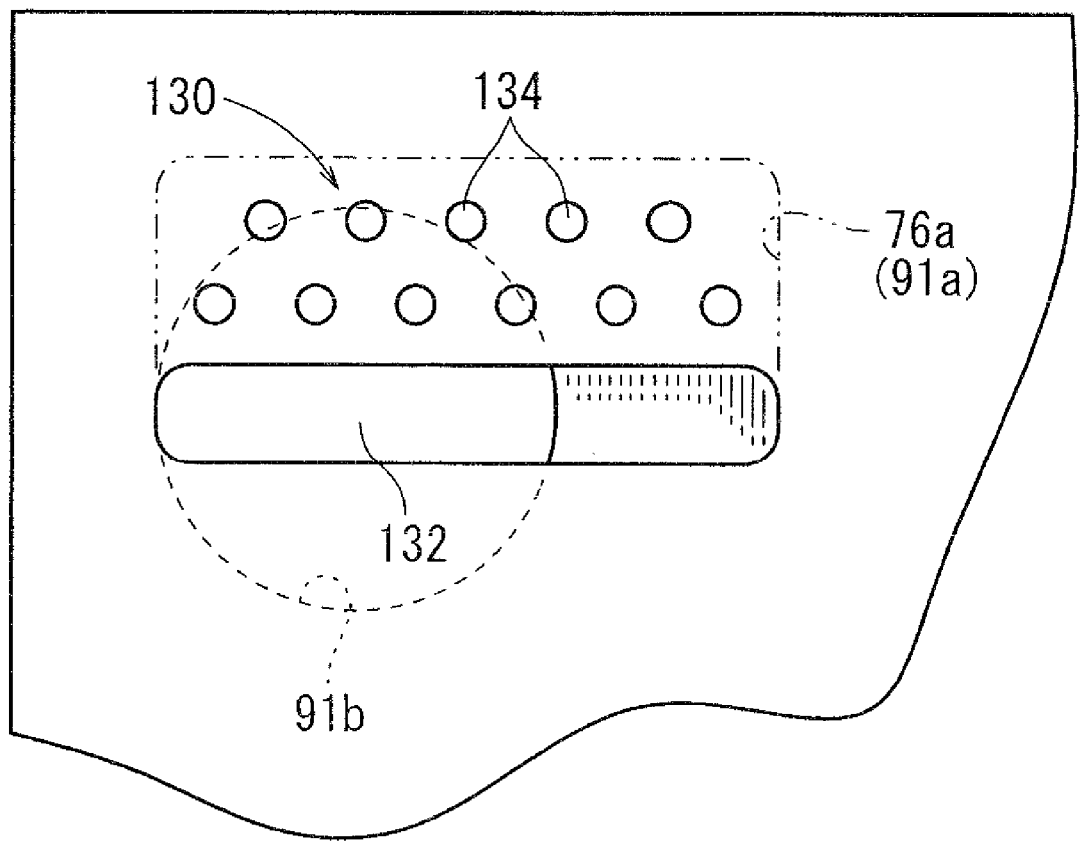
FIG. 4 is a perspective view showing a flow rectifier of the fuel cell system.

As shown in FIGS. 3 and 4, a flow rectifier 130 for rectifying the flow of the fuel gas is provided at a portion of the insulating plate 59b connecting the ejector 50 and the fuel gas supply passage 76a. The flow rectifier 130 has an opening 132 formed along the bottom of the fuel gas supply passage 76a having a laterally elongated shape, and a plurality of holes 134 provided above the openings 132. Substantially, the opening 132 is provided at a bridging portion between the fuel gas supply passage 76a and the fuel gas flow field 84.

Operation of the fuel cell system 10 will be described.

First, as shown in FIG. 1, the air pump 32 of the oxygen-containing gas supply mechanism 18 is operated to suck the external air as the oxygen-containing gas, and the air is supplied into the air supply pipe 34. The air flows from the air supply pipe 34 into the humidifier 36, and is supplied to the humidified air supply pipe 38.

At this time, as descried later, the oxygen-containing gas consumed in reaction (off gas) is supplied to the off gas supply pipe 40. Thus, water in the off gas moves to the air before consumption, and humidifies the air. The humidified air flows from the humidified air supply pipe 38 to the oxygen-containing gas supply passage 72a in the fuel cell stack 14 through the end plate 62b.

In the fuel gas supply mechanism 20, the shut-off valve 46 is opened, and the pressure of the fuel gas (hydrogen-gas) in the fuel gas tank 44 is decreased by the regulator 48. Thereafter, the fuel gas flows through the ejector 50, and flows to the end plate 62b. Thus, the fuel gas is supplied to the fuel gas supply passage 76a in the fuel cell stack 14.

Further, in the coolant supply mechanism 16, by operation of the coolant pump 26, the coolant flows from the coolant supply pipe 28 to the end plate 62a. Thus, the coolant is supplied into the coolant supply passage 74a in the fuel cell stack 14.

As shown in FIG. 2, after the air is supplied to each of the power generation cells 60 in the fuel cell stack 14, the air flows from the oxygen-containing gas supply passage 72a to the oxygen-containing gas flow field 88 of the second separator 70, and flows along the cathode 82 of the membrane electrode assembly 66 for inducing an electrochemical reaction at the cathode 82. The fuel gas flows from the fuel gas supply passage 76a to the fuel gas flow field 84 of the first separator 68, and flows along the anode 80 of the membrane electrode assembly 66 for inducing an electrochemical reaction at the anode 80.

Thus, in each of the membrane electrode assemblies 66, the oxygen in the air supplied to the cathode 82, and the fuel gas (hydrogen) supplied to the anode 80 are consumed in the electrochemical reactions at catalyst layers of the cathode 82 and the anode 80 for generating electricity.

The air consumed at the cathode 82 flows along the oxygen-containing gas discharge passage 72b, and is discharged as the off gas from the end plate 62b to an off gas supply pipe 40 (see FIG. 1). The off gas is supplied to the humidifier 36 as a humidifying gas.

Likewise, the fuel gas consumed at the anode 80 flows along the fuel gas discharge passage 76b, and is discharged as the exhaust fuel gas from the end plate 62b to the exhaust fuel gas pipe 52 (see FIG. 1). The exhaust fuel gas discharged to the exhaust fuel gas pipe 52 partially flows through the return pipe 54, and returns to the fuel cell stack 14 by sucking operation of the ejector 50, while being mixed with the fresh fuel gas. The remaining exhaust fuel gas is discharged when the purge valve 56 is opened.

Further, as shown in FIG. 2, the coolant flows from the coolant supply passage 74a to the coolant flow field 86 between the first and second separators 68, 70, and flows in the direction indicated by the arrow B. After the coolant cools the membrane electrode assembly 66, the coolant flows through the coolant discharge passage 74b, and the coolant is discharged from the end plate 62a to the coolant discharge pipe 30. As shown in FIG. 1, after the coolant is cooled by the radiator 24, by operation of the coolant pump 26, the coolant is supplied from the coolant supply pipe 28 to the fuel cell stack 14.

In the first embodiment, as shown in FIG. 3, the fuel gas supplied from the fuel gas pipe 45 to the fuel gas channel 106 of the nozzle 98 is injected to the diffuser 100 from the injection port 110 provided at the front end of the nozzle 98. In the structure, a negative pressure is generated in the suction chamber 114, and the exhaust fuel gas is sucked into the suction chamber 114 from the return pipe 54 through the off gas channel 104.

Therefore, the exhaust fuel gas is mixed with the fuel gas injected from the nozzle 98, and the mixed fuel gas is discharged from the outlet channel 116 of the diffuser 100 to the fuel gas supply passage 76a.

At this time, the flow rectifier 130 for rectifying the flow of the fuel gas is provided at the portion of the insulating plate 59b connecting the ejector 50 and the fuel gas supply passage 76a. As shown in FIG. 4, the flow rectifier 130 has the opening 132 having a laterally elongated shape on the lower side and the holes 134 provided above the opening 132. Since the lower side of the flow rectifier 130 is provided adjacent to the so called bridging portion, it is required to supply a large amount of the fuel gas to the lower side. It is preferable that the fuel gas is not supplied to the upper side. However, the holes 134 are provided to prevent the excessive pressure loss.

In the structure, the fuel gas discharged from the outlet channel 116 passes through the opening 132, and the fuel gas is smoothly and reliably supplied to the fuel gas flow field 84. When the fuel gas passes through the holes 134, the flow of the fuel gas is rectified. Then, the fuel gas is supplied to the fuel gas supply passage 76a.

Thus, the flow rate of the fuel gas discharged from the outlet channel 116 at relatively high speed is decreased by the rectifying operation of the flow rectifier 130. Therefore, improvement in the static pressure distribution in the fuel gas supply passage 76a is achieved. The fuel gas is uniformly and reliably distributed, and supplied to each of the power generation cells 60 of the fuel cell stack 14. Thus, the power generation performance and the performance of starting operation are improved effectively.

Further, since the insulating plate 59b has a flow rectifying function, the number of components is not increased.

Further, in the flow rectifier 130, various designs can be adopted in the diameter and the number of the holes 134 in correspondence with the shape or the like of the fuel gas supply passage 76a. The shape of the opening 132 is not limited to the laterally elongated shape. For example, the opening 132 may have a non-round shape including a wide portion in correspondence with the position where the fuel gas does not flow smoothly.

Although the first embodiment has been described in connection with a case where the fuel gas is circulated as a reactant gas supplied to the fuel cell stack 14, the present invention is not limited in this respect. The present invention is applicable to a case where the oxygen-containing gas is circulated as a reactant gas supplied to the fuel cell stack 14. In particular, the present invention is suitably applicable to a case where pure oxygen is used as the oxygen-containing gas.

Figure 5:
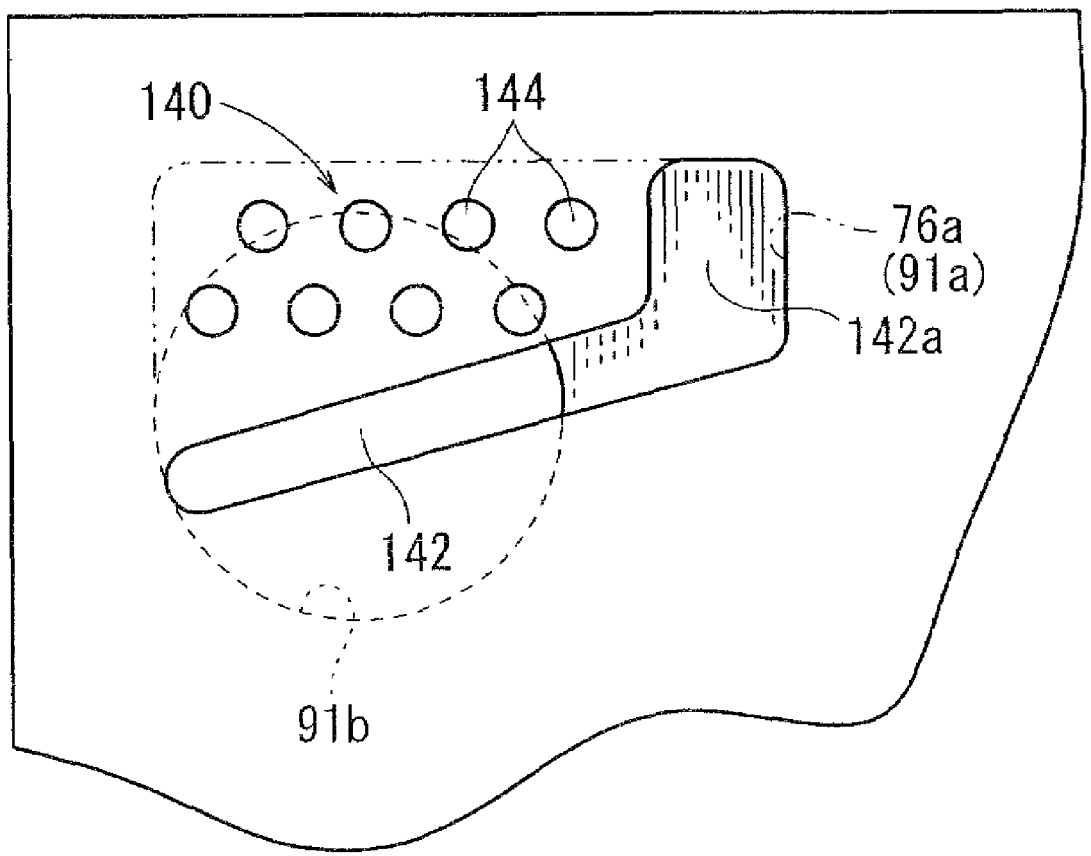
FIG. 5 is a cross sectional view showing main components of a flow rectifier of a fuel cell system according to a second embodiment of the present invention.
Figure 6:
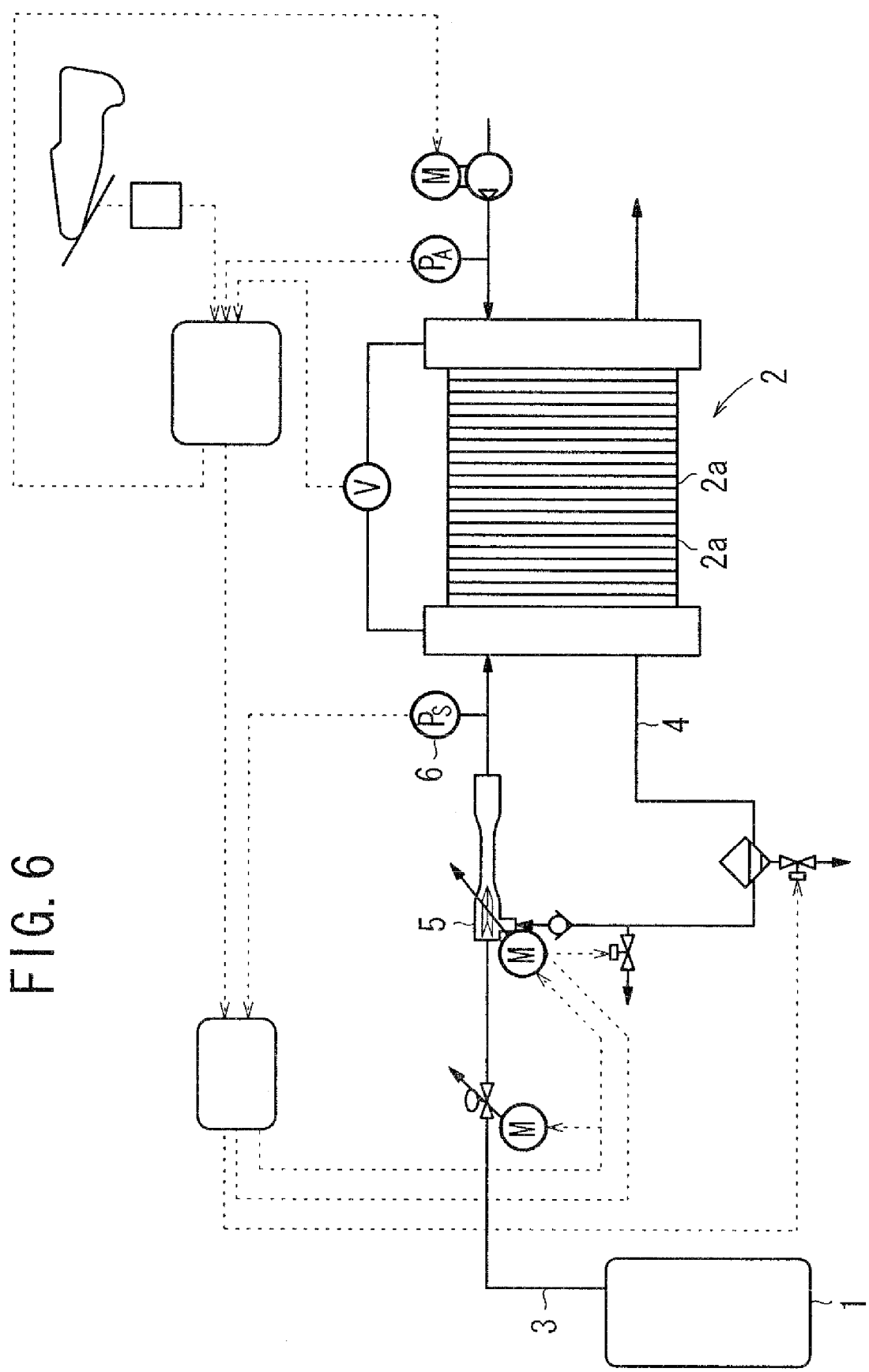
FIG. 6 is a diagram showing a fuel cell system disclosed in Japanese Laid-Open Patent Publication No. 2004-095528.

FIG. 5 is a view showing a flow rectifier 140 of a fuel cell system according to a second embodiment of the present invention. The constituent elements that are identical to those of the fuel cell system 10 according to the first embodiment are labeled with the same reference numerals, and description thereof will be omitted.

The flow rectifier 140 has an opening 142 formed along the bottom of the fuel gas supply passage 76a, and a plurality of holes 144 provided above the opening 142. The diameter of the holes 144 is larger than the diameter of the holes 134, and the number of the holes 144 is smaller than the number of the holes 134. The opening 142 has a laterally elongated shape including a wide portion 142a having a large opening in the height direction in correspondence with the position where the fuel gas does not flow smoothly, in the vicinity of the so called bridging portion. This structure is intended to allow the fuel gas to flow easily into the reaction surface from the bridge portion.

In the second embodiment having the above structure, the same advantages as in the case of the first embodiment is obtained. For example, the fuel gas is uniformly and reliably supplied to each of the power generation cells 60 of the fuel cell stack 14.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell system including:
   a fuel cell stack formed by stacking a plurality of power generation cells in a stacking direction, a reactant gas supply passage for supplying at least a fuel gas or an oxygen-containing gas as a reactant gas extending through the fuel cell stack in the stacking direction; and
   a reactant gas supply mechanism having an ejector for supplying the reactant gas to the reactant gas supply passage, and returning the reactant gas discharged from the fuel cell stack after consumption to the reactant gas supply passage, the reactant gas supply mechanism being connected to one end plate of the fuel cell stack,
   wherein the fuel cell stack includes an insulating plate adjacent to the one end plate, and the insulating plate includes a flow rectifier at a portion connecting the ejector and the reactant gas supply passage for rectifying a flow of the reactant gas.

2. A fuel cell system according to claim 1, wherein the reactant gas supply passage is in a form of a laterally elongated hole;
   the flow rectifier includes an opening formed along a bottom of the laterally elongated hole; and
   a plurality of holes provided above the opening.

3. A fuel cell system according to claim 1, wherein the reactant gas is the fuel gas, and the reactant gas supply passage is a fuel gas supply passage.

4. A fuel cell system according to claim 2, wherein the opening has a wide portion opened in a height direction of the laterally elongated hole.

* * * * *